US009182524B2

(12) United States Patent
Smithwick et al.

(10) Patent No.: US 9,182,524 B2
(45) Date of Patent: Nov. 10, 2015

(54) AUTOSTEREOSCOPIC DISPLAY SYSTEM WITH ONE DIMENSIONAL (1D) RETROREFLECTIVE SCREEN

(75) Inventors: Quinn Smithwick, Pasadena, CA (US); Lanny S. Smoot, Thousand Oaks, CA (US); Daniel Reetz, North Hollywood, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 786 days.

(21) Appl. No.: 13/248,322

(22) Filed: Sep. 29, 2011

(65) Prior Publication Data

US 2013/0083291 A1 Apr. 4, 2013

(51) Int. Cl.

| | |
|---|---|
| ***G03B 21/00*** | (2006.01) |
| ***G03B 21/26*** | (2006.01) |
| ***G02B 5/02*** | (2006.01) |
| ***G03B 21/60*** | (2014.01) |
| ***G02B 27/22*** | (2006.01) |
| ***G03B 35/20*** | (2006.01) |
| ***A63J 25/00*** | (2009.01) |
| ***A63G 31/16*** | (2006.01) |

(52) U.S. Cl.

CPC .............. *G02B 5/0257* (2013.01); *A63G 31/16* (2013.01); *A63J 25/00* (2013.01); *G02B 27/225* (2013.01); *G02B 27/2214* (2013.01); *G03B 21/60* (2013.01); *G03B 35/20* (2013.01)

(58) Field of Classification Search

CPC ........ G03B 21/14; G03B 21/60; G03B 35/20; G03B 21/602; G03B 27/225; G03B 5/0257; G03B 27/2214; G03B 27/22; G03B 27/44; A63J 25/00; A63G 31/16

USPC .......... 353/7, 13, 39, 121, 94; 348/42, 46, 51, 348/837; 359/449, 454, 455, 458, 459, 462, 359/464, 465; 352/57, 60, 62; 472/60, 61

See application file for complete search history.

(56) References Cited

U.S. PATENT DOCUMENTS

| | | | | |
|---|---|---|---|---|
| 6,292,305 | B1 * | 9/2001 | Sakuma et al. | 359/649 |
| 6,323,999 | B1 * | 11/2001 | Ueda et al. | 359/443 |
| 6,431,989 | B1 * | 8/2002 | Katayama et al. | 472/60 |
| 6,702,442 | B2 * | 3/2004 | Agostinelli et al. | 353/7 |

(Continued)

OTHER PUBLICATIONS

Nguyen, David, "MultiView: Spatially Faithful Group Video Conferencing," May 23, 2005.

*Primary Examiner* — Que T Le
*Assistant Examiner* — Jennifer Bennett
(74) *Attorney, Agent, or Firm* — Marsh Fischmann & Breyfogle LLP; Kent A. Lembke

(57) ABSTRACT

An autostereoscopic apparatus for providing a 3D image to a viewer at a range of vertical eye locations. The apparatus includes a projection screen with a light receiving surface that is horizontally retroreflective and vertically diffusive. The apparatus includes a projector assembly including at least two projectors arranged side-by-side such that projection lenses of the projectors are horizontally aligned in a row. The apparatus includes a controller selectively operating the projectors to project at least two differing point-of-view images. The projection screen may take a number of useful embodiments to implement the autostereoscopic apparatus. For example, the projection screen may include a bottom layer including a retroreflective film that is retroreflective at least in the horizontal direction such as a brightness enhancement film and a top layer formed of a transparent sheet of lenticular material arranged for vertical diffusing.

6 Claims, 5 Drawing Sheets

(56) References Cited

U.S. PATENT DOCUMENTS

| | | | | |
|---|---|---|---|---|
| 6,752,498 | B2 * | 6/2004 | Covannon et al. | 351/240 |
| 8,432,436 | B2 * | 4/2013 | Debevec et al. | 348/51 |
| 2004/0239880 | A1 * | 12/2004 | Kapellner et al. | 353/20 |
| 2006/0109548 | A1 * | 5/2006 | Goto | 359/449 |
| 2006/0204676 | A1 * | 9/2006 | Jones et al. | 428/1.1 |
| 2007/0231561 | A1 * | 10/2007 | Pellerite et al. | 428/323 |
| 2008/0036969 | A1 * | 2/2008 | Otsuka et al. | 353/7 |
| 2010/0253916 | A1 | 10/2010 | Gao et al. | |
| 2010/0253917 | A1 * | 10/2010 | Gao et al. | 353/7 |
| 2014/0022511 | A1 * | 1/2014 | Kuo et al. | 353/10 |

* cited by examiner

AUTOSTEREOSCOPIC DISPLAY SYSTEM WITH ONE DIMENSIONAL (1D) RETROREFLECTIVE SCREEN

BACKGROUND

1. Field of the Description

The present invention relates, in general, to projecting or displaying video/animated or still three dimensional (3D) images, and, more particularly, to autostereoscopy methods and systems for providing glasses-free 3D using a one dimensional (1D) retroreflective screen.

2. Relevant Background

There are numerous entertainment and other settings where it is desirable to create unique visual displays to entertain and excite viewers. For example, theme or amusement parks may include rides or walk-through attractions where guests (or "viewers") are entertained by a unique visual effect or illusion. Often, it is desirable to create a display with three dimensional (3D) images, and, even more desirable for many entertainment facility operators is to provide the 3D display without requiring the viewer to wear special headgear or glasses, e.g., using autostereoscopy or similar techniques.

In recent years, the incorporation of 3D stereoscopic projection and imagery into ride attractions has been rapidly increasing. However, many of these attractions require that the rider wear 3D glasses, which causes the ride operator to purchase and provide the glasses and also to gather, clean, and replenish the 3D glasses. Additionally, many riders find the glasses to be uncomfortable, and the one-size-fits-all models are often ill-fitting requiring ongoing adjustment or repositioning by the wearers especially after rapid or jerky vehicle movements in the ride.

With these problems in mind, operators of entertainment facilities recognize that the use of autostereoscopic projection or 3D without need for glasses would greatly enhance the sense of immersion and improve the rider experience as well as reducing problems with providing glasses or headgear. Unfortunately, it has proven difficult to provide autostereoscopic displays for a large number of viewers. The difficulty is in part due to the need to provide appropriate left and right eye views for many people over a large viewing area. A large number of views are used to provide deep images without ghost images and to allow the display system to be robust to user head motion.

One effective way to produce autostereoscopic imagery for each viewer is to provide two projectors, such as microprojectors, in close proximity to each viewer's eyes that project onto a retroreflective screen. The projectors project appropriate left and right eye images toward the retroreflective screen, and the retroreflective screen sends the light back toward the projectors and the nearby left and right eyes. In other words, a left eye projector is provided that provides left eye images and a right eye projector is provided that provides right eye images. Further, the conventional retroreflective screen sends the light back without diffusing the light, and slight imperfections in the retroreflected direction allow each eye of the viewer to view the bright retroreflected images of the projector it is closest to but not the images from the other projector (e.g., each eye only sees the left or right eye images). The retroreflected direction is accurate enough that the brightness drops significantly when the eye is not nearly collocated with one of the projectors.

Unfortunately, it has proven cumbersome to place a pair of projectors next to each viewer's head. For example, many display applications have to be suited to viewers of varying height, which would force a display operator to provide adjustment of the location of the two projectors to suit each and every viewer's height and head location in the ride or show setting. Additionally, the use of two projectors and a conventional retroreflective screen locks the viewer into a single viewing position and does not allow the viewer to move their head during the ride or show as their eyes and the projectors will quickly not be collocated ruining the 3D imagery.

In some rides or attractions, a 3D display is created by combining the use of a beamsplitter with a conventional retroreflective screen. Projectors project imagery on the rear surface of the beam splitter, and this light is reflected toward the retroreflective screen where it is reflected back to a viewer looking through a front surface of the beamsplitter. While providing a 3D display, the viewer is forced to look through a beamsplitter. To provide a wide angle view, either the beamsplitter is placed very close to the viewer or a large beamsplitter must be used. Such 3D displays have not provided a truly immersive experience as the use of the beamsplitter separates the viewer from the scene by enclosing them, for example, in a ride vehicle, which reminds them they are looking at a virtual scene. Typically, the projectors must also track the viewer's head movements, which can prove difficult or add complexity to a display system or ride.

One approach is to provide a 1D retroreflective screen that retroreflects horizontally but diffuses vertically so viewers anywhere in a vertical strip or below the projectors see stereoscopic images. Prior 1D retroreflective screens have been made by taking 2D retroreflective materials, i.e., either spheres or corner cubes, and converting them to a diffusive 1D retroreflective material by layering a lenticular or directionally preferring diffuser. The lenticular and retroreflective material are sometimes spaced apart. The 2D retroreflector, even with the vertical diffuser, preferentially reflects back to the projector away from the viewer's head. A vertical diffuser preferentially diffuses about the incoming angle of light, which is towards the projector. Therefore, the vertical diffusion adds a vertical view zone about the projector but not about an average person's head height. The vertical diffusion angle must be large enough so the half angle of diffusion is large enough to cover from the projector to the range of viewer head heights. As a result, large amounts of light are wasted, and, further, half of the light still diffuses above the projectors away from a viewer's head.

In these prior screens, the 2D retroreflective material is made up of microspheres or corner cubes. For the spheres, only a ring of light incident on the spheres is retroreflected through total internal reflection such that there is a missing cone of light in the middle of the sphere that is not retroreflected. Hence, there is light loss. The corner cube retroreflects a majority of the light, but the reflection is not through total internal reflection but, rather, is through a metallized reflector. As a result, there is still an amount of light loss although this configuration may be brighter than a microsphere 1D retroreflective screen. The 2D retroreflective material made with spheres can be made roll-to-roll, but it is not as bright as the corner cube material, which cannot be made roll-to-roll and is typically stamped and tiled, which leaves seams in the screen.

These prior screens often have a spacing gap (e.g., 10 to 30 mm) between the 2D retroreflector and the vertical diffuser, which leads to a thicker multipiece screen assembly. The spacing may be air or a material (such as plastic). If the gap or spacing is relatively thick plastic (e.g., greater than 10 mm), the screen likely will not be flexible. If it is an air gap, the screen also will typically not be made flexible so as to ensure that the air gap is consistent throughout the screen. Regardless, these prior screens typically included some set of frames and frame holders to maintain the gap between the 2D retroreflector and the film. In addition to problems with rigid or non-flexible screens, the imagery may be less sharp due to the inclusion of the gap, e.g., an air gap may produce some blur.

Hence, there remains a need for improved visual display techniques and systems for creating or projecting 3D images. Preferably, such an advanced 3D display system would provide a high-contrast 3D dimensional image without requiring a viewer to wear special head gear or glasses. Further, it may be preferable that the 3D display system not require adjustments to suit a viewer's height, e.g., any viewer in a particular seat or other viewing location may view the 3D images without regard to their height and vertical position of the viewer's eyes.

SUMMARY

The present invention addresses the above problems by providing a 3D display system that includes an assembly of projectors with two or more projectors (e.g., microprojectors) providing differing views (e.g., a plurality of rightleft eye images). The 3D display system also includes a retroreflective screen to direct the light and imagery projected by the projectors back to a viewer positioned in a viewing location proximate to the projectors such as in a vehicle or theatre seat below the projectors. The retroreflective screen may be configured to be vertically diffusing or to be a one-dimensional (1D) diffusing retroreflective screen constructed from a normally one-dimensional reflective screen with an anisotropic diffusing layer. In this way, the viewer's head and their eyes do not have to be locked into a single position to view the 3D display, and the viewer may position their head at any vertical location below the projector assembly and still have their left and right eyes collocated (vertically) with a pair of the projectors in the projector assembly. Further, the resulting screen has a different structure than prior 1D retroreflective screens and is brighter and thinner and can be made in a roll-to-roll process.

The inventors recognized that only horizontal differences in left and right eye images contribute to the perception of the depth and 3D stereoscopic vision. Therefore, only a 1D horizontal retroreflection is needed to redirect the images back to the viewer's eyes. The 1D retroreflective screen used in 3D display systems described herein is vertically diffusive such that the images are directed above and below the projectors. This allows viewers to see a pair of images from the projectors in 3D as long as they keep their eyes in a single vertical plane (i.e., the same vertical planes as two of the projectors' outputs or lenses). In contrast, conventional retroreflective screens are designed to retroreflect back to the source and not in a vertical plane of the source such that any significant vertical movement of a viewer's head without a like change in the projectors ruins the 3D display. The 3D display systems taught herein may be used to provide a new amusement park ride with the projector assembly provided in a ride vehicle seat at a location above where a passenger's head would be positioned. In other cases, the 3D display systems may be used to provide an autostereo movie experience with each movie house seat having microprojectors mounted above the viewer's head, such as mounted in the head rest or the like. The projectors are projected onto a 1D retroreflective screen.

More particularly, an autostereoscopy apparatus is provided that can provide a 3D image to a viewer at a range of vertical eye locations. The apparatus includes a projection screen with a light receiving surface that is horizontally retroreflective and vertically diffusive. The apparatus also includes a projector assembly including at least two projectors arranged side-by-side such that projection lenses of the projectors are horizontally aligned in a row. Further, the apparatus includes a controller selectively operating the projectors to project at least two differing point-of-view images toward the light receiving surface of the projection screen.

Typically, the apparatus also includes a seat with a pan for receiving a viewer and with a back support for supporting a back of the viewer. Then, the row of the projectors is mounted at a predefined height above the pan, whereby a head of the viewer is at an offset distance below the projectors (e.g., the projectors are above-head mounted in the apparatus) and at least two of the projectors are vertically aligned with left and right eyes of the viewer. The seats may be provided in a theater or similar setting (with the projectors in the upper portion of the head rest or the like of the back support) while, in other cases, the seat is provided in a passenger vehicle of an amusement park ride, whereby the seat and the viewer move relative to the projection screen during operation of the amusement park ride. While two are the minimum number of projectors and head-position tracking may be used to move the projectors with the viewer's head, some embodiments use fixed projectors with at least five of the projectors. In practice, adjacent pairs of the projectors may be positioned with the projection lenses separated by less than about 3 inches (e.g., at an average or maximum interocular distance or the like for expected viewers using the apparatus).

The projection screen may take a number of useful embodiments to implement the autostereoscopic apparatus. For example, the projection screen may include a bottom layer including a retroreflective film that is retroreflective at least in the horizontal direction and a top layer covering the bottom layer. In such cases, the top layer includes a sheet of lenticular material arranged for vertical diffusing. The 1D retroreflective film may be a brightness enhancement film arranged or positioned relative to the lenticular top layer to provide retroreflection in a single direction that is orthogonal to a direction of diffusing provided by lenticules of the lenticular material of the top layer. A brightness enhancement film (or similar material with V-grooves or prismatic ridges) is used that when properly oriented, as determined by the inventors, acts naturally (though not obviously) as a 1D retroreflective material.

The brightness enhancement film uses total internal reflection within ridges so that all the light is retroreflected in one direction (and reflected in the orthogonal direction), and the screen becomes or is extremely bright. These films, though, are not diffuse in the orthogonal direction but, instead, are reflective. An anistropic diffuser (e.g., a lenticular sheet or holographic anisotropic diffuser that may be known as a light shaping diffuser) may be added orthogonal to the 1D retroreflective angle. Spacing or a gap between the 1D retroreflector and the anisotropic diffuser is not required. Because only ridges are made, a roll-to-roll process may be used to manufacture the film for easier large scale construction or fabrication. Also, the brightness enhancement film will reflect (not retroreflect) the light vertically. Hence, projectors above the viewer's head can preferentially reflect into a viewer's eyes. The vertical diffusion then adds additional vertical view zone about that reflection. The use of the brightness enhancement film and a vertical diffuser makes the image brighter in a zone centered at the viewer's eyes, not about the projector or projection location.

In some cases, the projection screen includes a bottom layer including a retroreflective film with a light receiving surface including a top layer covering the light receiving surface of the bottom layer. In some cases, the top layer includes a holographic vertical diffuser (e.g., an anisotropic diffuser).

DETAILED DESCRIPTION

Embodiments described herein are directed toward a 3D display system that includes a one-dimensional (1D) retroreflective screen. Briefly, the inventors have invented a 1D retroreflective screen that can be used with sets of microprojectors mounted above each viewer's head, e.g., riders in a ride vehicle or guests of a movie theatre. Each viewer perceives a bright 3D image appropriate from their viewpoint without the need for head tracking or precise head placement relative to the projectors. The 3D display system is usable in continuous ride systems with multiple riders or viewers in close proximity and a shared 1D retroreflective screen and over a large viewing area. Each rider has a correct perspective of the displayed 3D objects and scenery from their vantage point or viewpoint.

The 3D display system is composed of a novel 1D retroreflective projection screen and a set of microprojectors (a projector assembly) mounted above each viewer's head. Microprojectors are compact, inexpensive, high-resolution, and bright enough, especially with retroreflection, that providing a set of such projectors for each viewer (such as each rider of a ride or themed attraction) is realistic from a cost and operation standpoint. Two microprojectors may be used with head tracking, e.g., ultrasonic or optical, and the projectors may he moved in concert with tracked movement of the viewer's head such as by mounting the projectors on a translation stage or the like. This may be achieved through the use of accurate tracking components and selectively and controllably moved parts.

One preferred embodiment of the 3D display system involves mounting multiple microprojectors in a row, with each providing its appropriate view. This creates a multi-view autostereoscopic projection so that the viewer may perceive slight parallax, and it avoids possible pseudoscopic views where the right eye sees the left view and vice versa. In the ride implementations of the 3D display system, as the ride vehicle with the projectors and viewer travels, a controller may operate to update all the views or content provided to the set of projectors such that the projectors are projecting the appropriate views from each new vantage point or view point in which the rider is positioned via the moving vehicle.

Figure 1:
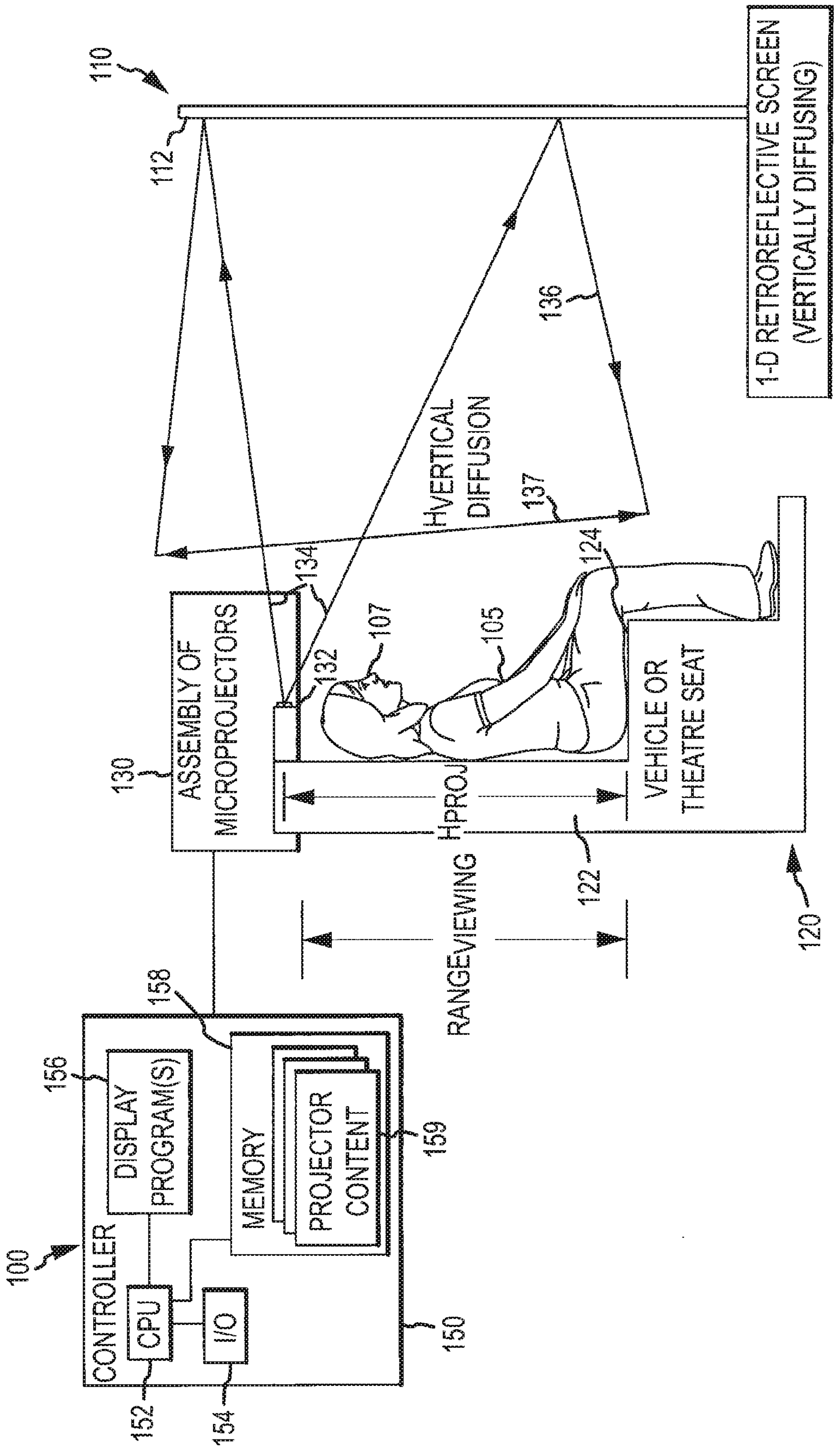
FIG. 1 illustrates a side schematic or functional block view of a 3D display system that utilizes a number or assembly of projectors combined with a 1D retroreflective screen to provide an autostereoscopic display.

FIG. 1 illustrates a side, schematic (or functional block) view of a 3D display system 100 according to one embodiment of the invention. As shown, the system 100 includes a 1D retroreflective projection screen 110. The screen 110 may be designed as described above and as shown in detail below in FIGS. 4A-4C, and it is designed with a light receiving surface or projection surface 112 that is adapted to be vertically diffusing but horizontally retroreflective (i.e., the one dimension in which the screen 110 is retroreflective).

The system 100 also includes a seat 120 (or similar positioning device) for positioning a viewer 105 relative to the screen 110 and to a projector assembly 130. The seat 120 may be a seat provided in a passenger vehicle of a ride in some cases or a movie theater or similar seat. The seat 120 includes a bench or pan 124 for receiving a seated viewer 105, and the seat 120 also includes a back support 122 extending upward vertically from the pan 124. As will become clear, the height of the passenger 105 (e.g., 2 to 3 feet or more above the pan 124) may vary to practice the invention without requiring repositioning of the projector assembly 130, and this allows the viewer's eyes 107 to be located nearly at any vertical height above the seat pan 124 such as within a predefined viewing range, $\text{Range}_{Viewing}$, that may match or exceed the height of the seat back/back support 122 and may be measured from the seat pan 124 to the bottom of the projector 132 or projector assembly 130.

The display system 100 includes a projector assembly 130 that may include a plurality of microprojectors such as projector 132 shown in FIG. 1. Each microprojector 132 in the assembly 130 typically is arranged to have its output or projection lens in a single horizontal plane (to be coplanar in a plane parallel to the floor or the seat pan 124 or the like). Typically, the projector assembly 130 will include at least two projectors 132 and, more typically 2 to 5 or more projectors arranged in a row. The spacing between adjacent projectors 132 may be about an interocular distance expected for the viewer 105 (e.g., about 2 to 3 inches with some applications using a projector spacing of about 2.5 inches as measured from the center of the projection lens).

The display system 100 also includes a controller 150, such as a computer or computing device, in communication with the projector assembly 130 to selectively provide content, e.g., appropriate views, to each of the projectors such as projector 132. As shown, the controller 150 includes a processor 152 running one or more display programs 156 (e.g., software and/or code configured to cause the computer/controller 150 to perform particular functions as described herein). The controller 150 includes input/output (I/O) devices 154 such as a monitor with or without a touch screen for displaying user interfaces (that may be provided by programs 156), a keyboard, a mouse, and so on for allowing an operator to provide input to the controller 150, e.g., to initiate a program 156 or to select content 159 to project via projector assembly 130.

The controller 150 includes memory or memory devices 158 for storing digital data including projector content 159 (at least temporarily as such content may also be streamed to the controller 150 over a network or directly to the projector assembly 130). The projector content 159 may include views associated with each projector in assembly 130 and its relative location in a row of microprojectors 132. For example, images may be captured with a plurality of video cameras at locations spaced apart similarly to the spacing of the projectors 132 and then later projected with the projectors of assembly 130 to provide spatially correct images creating a 3D display (with the left and eye viewing differing images). In other cases, the content may include computer graphics or other still or video images and content.

In use or operation by the controller 150, each of the projectors, such as projector 132, is operated to project light or images associated with content 159 as shown with arrows 134. The light 134 strikes the surface 112 of 1D retroreflective projection screen 110. FIG. 1 shows that the projection screen 110 is diffusing in the vertical direction (or is vertically diffusing or diffusive to light). As shown, the light 134 is horizontally retroreflected 136 back toward the projector 132 and is vertically and diffusely reflected to the viewer 105 and their eyes 107. Because the screen 110 is vertically diffusing, the light 136 in a vertical plane as shown with line 137 includes similar content when viewed by the viewer 105. The height, $H_{Vertical\ Diffusion}$, as measured proximate to the expected viewing position of the viewer's eyes 107 is typically selected to be greater than or equal to a viewing range, $Range_{viewing}$, which in turn is generally a location of viewer's eyes 107 for the shortest anticipated rider 105 to the tallest anticipated rider 105.

In other words, the viewer 105 can continue to see the light in a vertical plane associated with projector 132 that is vertically diffused by the screen 110 as long as they keep their eye generally in a single vertical plane (e.g., duck their head straight down), but more generally the system 100 is useful for a riders 105 of varying and widely ranging heights (or vertical eye positions when seated on pan/bench 124 of seat 120). To this end, the embodiment 100 of FIG. 1 shows that the projectors including projector 132 of assembly 130 are mounted above the head and eyes 107 of the viewer 105 when they are positioned in the seat 120. The height, $H_{Projector}$, at which the projector 132 is mounted above the seat pan or bench 124 is typically selected to suit a tallest expected viewer 105, and the vertical diffusion quality of the projection screen 110 as shown with line 137 allows both the tallest and shortest viewer 105 to view reflected images/light 136 projected from the projector 132 and reflected in a vertically diffused manner by the surface 112. The distance of the viewer 105 and seat 120 from the surface 112 may be small (a few to several feet) or be quite large (10 to 50 feet or the like) as found in typically movie theatre settings.

Hence, the vertical viewing range, $Range_{Viewing}$, is substantially the same or somewhat smaller than the height, $H_{Projector}$, at which the projector 132 is mounted, such as onto or above the seat back/back support 122. For example, projector 132 may be mounted 3 to 4 feet or more over the pan 124 such that the vertical viewing range, $Range_{Viewing}$, for each projector 132 is also about 3 to 4 feet or more in the 3D display system 100. The projector 132 may be mounted within the seat back 122, e.g., some relatively small distance behind the viewer's head, but, more typically, is mounted more directly overhead with the projection lens of the projector 132 being forward (closer to the screen 110) of the viewer's eyes 107 or other body parts so as to limit interference with projected light 134 by the viewer 105 (such as by leaning forward or waving their arms and the like). Such interference risk is also reduced by choosing the projector height, $H_{Projector}$, to be some preset distance greater than an anticipated tallest viewer's head, such as 1 to 2 feet above the viewer's head. Again, though, the projector 132 is positioned to be directly over one of the viewer's eyes 107 at least in some head positions of the viewer 105 in the seat 120, with other projectors in a row in assembly 130 provided to be aligned with the other viewer's eye 107 and also other likely eye locations (e.g., account for some amount of horizontal movement of the viewer's head and eyes 107 or variance in how a viewer 105 sits or holds their head in the seat 120).

Figure 2:
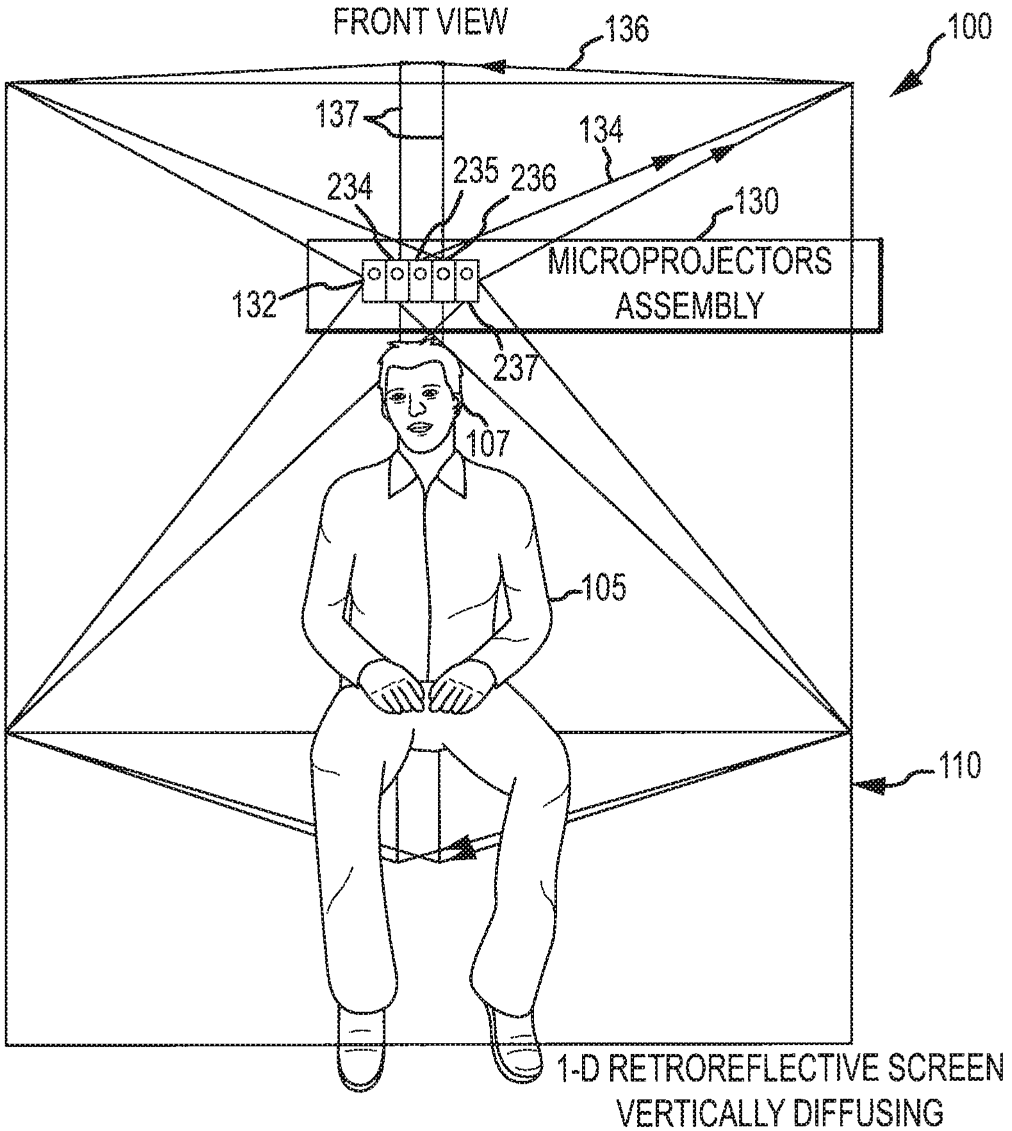
FIG. 2 illustrates a portion of the 3D display system of FIG. 1 from a front view or looking out toward a viewer/audience through the 1D retroreflective screen.

FIG. 2 illustrates the 3D display system 100 looking out from the projection screen 110 as if the screen 110 were transparent, which it is not in practice, to further explain the components of the system 100. As shown, the projector assembly 130 includes a horizontal row of a number of side-by-side projectors spaced closely together (e.g., outputs spaced apart by the interocular distance or less or 1 to 3 inches apart as measured between centers of the projection lenses of adjacent pairs of the projectors). As shown, the projection lenses of the projectors, including projector 132, are several inches to about 1 foot or more over this "average" to tall viewer 105 (e.g., a viewer with a height of just under 6 to about 7 feet). In the specific, but not limiting example of 3D display system 100, the assembly includes five microprojectors 132, 234, 235, 236, 237. This allows the viewer 105 to move their head back and forth or side-to-side to move their eyes 107 horizontally a small distance (a few inches either direction) and still view the 3D images projected by assembly 130.

When the viewer 105 is positioned as shown in FIG. 2, his eyes 107 may be generally aligned with projectors 235 and 236 (when the projectors in assembly 130 are positioned apart by about an interocular distance). In other words, a vertical plane passing through the projection lens of the projectors 235, 236 also may pass through or nearly through the viewer's right and left eyes 107. As a result, the reflected light 136 from projectors 235, 236 is diffused vertically as shown with lines 137 such that the viewer 107 may view the left and right eye images at any vertical location or height along the line 137. However, the projection screen 110 is configured to be a 1D retroreflective screen with the one direction or dimension being the horizontal direction (i.e., to be horizontally retroreflective). As a result, the viewer 105 has images/light from projectors 235, 236 directed to their eyes 107 without interference from or viewing of images/light from other projectors 132, 234, 237 (e.g., only receive light from projectors in assembly 130 for which the eyes 107 are vertically aligned). In this manner, the autostereo images are provided to the viewer 105 with the combination of the projector assembly 130 and the 1D retroreflective screen 110.

Figure 3:
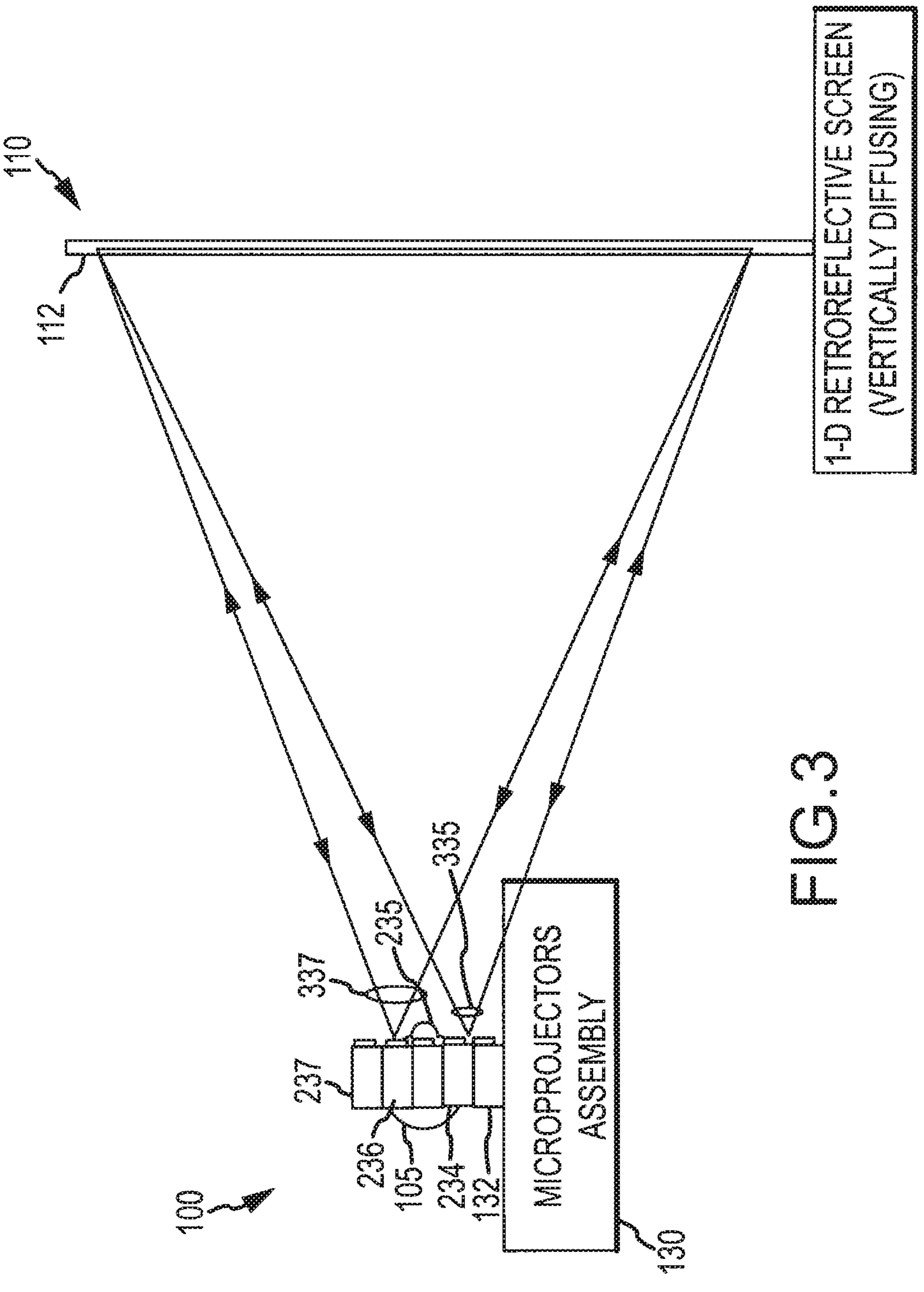
FIG. 3 illustrates a top view of a portion of the 3D display system of FIG. 1.

FIG. 3 illustrates a top view of the 3D display system 100. In this example, the viewer 105 is shown to be positioned beneath the row of projectors 132, 234, 235, 236, 237 and facing the reflecting surface 112 of projection screen 110. In this example, the viewer's eyes may be generally vertically aligned with a pair of projectors 234, 236. As discussed above with reference to FIGS. 1 and 2, the viewer 105 will be able to view images 335, 337 regardless of the vertical positioning of their head and eyes 107 as long as vertical alignment is retained. FIG. 3 also illustrates, though, that the projection screen 110 is horizontally retroreflective such that light 335 from projector 234 is reflected back from surface 112 of screen 110 back toward the projector 234, and vertical diffusion allows the viewer 105 below the projector 234 to view the images/light 335. Likewise, light/views 337 from projector 236 are directed back toward the projector 236 by screen 110 but with vertical diffusion to allow the viewer 105 to view these views/light 337 when their eye (left eye in this example) is vertically aligned below the projector 236.

In a system such as 3D display system 100, there will be a minimum of two projectors provided in the projector assembly 130. If only two projectors are utilized, the system 100 may also include head tracking equipment to track movement and positioning of the viewer 105 (e.g., a determination of a horizontal position of their eyes 107). Vertical tracking is not required due to the provision of vertical diffusion with screen 110. Positioning equipment would be provided that is operable by the controller 150 to change the horizontal location of the two (or more) projectors of assembly 130 to retain an alignment of two projectors with the eyes 107 of the viewer, e.g., the projectors of assembly 130 may be on a linear track with a linear actuator moving the projectors side-to-side or along the track to stay over the viewer's head/eyes 107.

In use, as discussed, each projector of assembly 130 is operated by controller 150 to provide a different POV (or view) or image. In some embodiments, the controller 150 may only operate two of the projectors of assembly 130 at a time (e.g., the pair determined to be vertically aligned with the viewer's eyes 107), and, in such cases, two or more projectors may be used to project the appropriate views. For example, if only two projectors are on, then they could project a stereo pair (left eye and right eye views corresponding to the projector above each eye). Then, as the viewer's head moves, the stereo pair images may move with the eye (left eye image stays above left eye and right eye image stays above right eye), but these images are projected from different projectors now. In another example, as the viewer's head moves, different viewpoints can be projected corresponding to the new position of the eye (multiview). This technique may be used to avoid or reduce cross talk between those images that are being projected and viewed and those that are being projected and not viewed. The switching between pairs of projectors may be performed by the controller 150 based on head tracking or other monitoring of the position of the viewer 105.

A number of projection screens may be used to provide the projection screen 110 of the 3D display system 100. Each of these embodiments are configured to be horizontally retroreflective (i.e., horizontally, the screens reflect light back in the same direction the light came from such as back towards a microprojector in a projector assembly) and also to be vertically diffusing or diffusive. In this manner, the projection screens are bright in a vertical line and provide horizontal parallax only, and a viewer's perspective does not change if they lower or raise their head (as is true for conventional retroreflective projection screens).

Figure 4B:
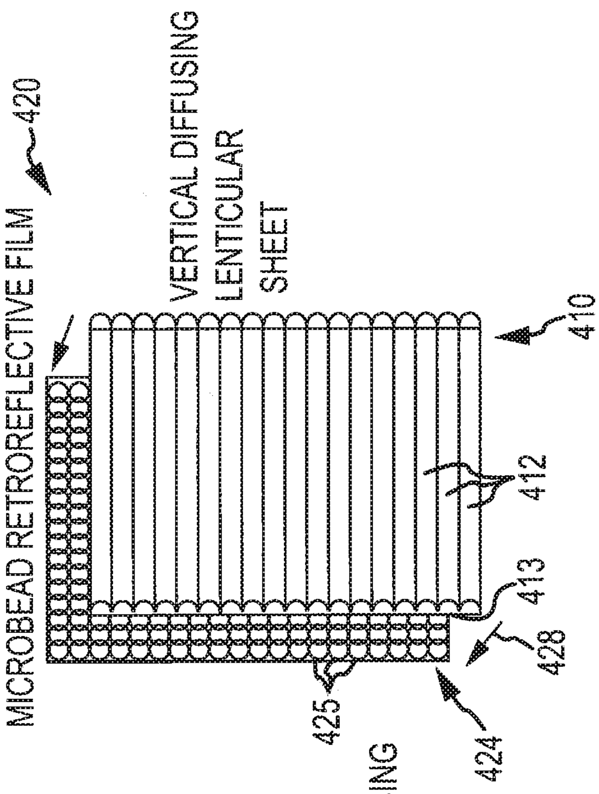
FIGS. 4A-4C illustrate three embodiments of exemplary 1D retroreflective screens that may be used in a 3D display system such as the display systems of FIGS. 1-3.
Figure 4A:
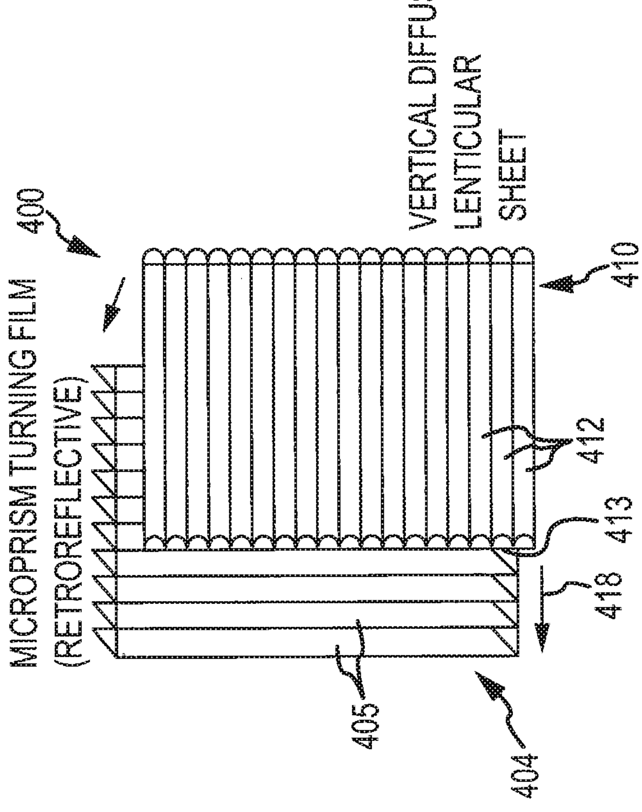

FIG. 4A illustrates an exemplary 1D retroreflective projection screen 400 that may be used to implement screen 110 of system 100 of FIGS. 1-3. As shown, a 1D retroreflective projection screen 400 is illustrated that is retroreflective in the horizontal direction and concurrently vertically diffusing to light. To this end, horizontal retroreflection is provided with a base sheet or layer 404 in the form of a brightness enhancement film with a light receiving or upper surface covered with microprisms 405 (e.g., elongated structures with a prismatic cross sectional shape) with longitudinal axes extending in the vertical direction. The microturning (prismatic) film 404 is selected and/or designed to exhibit 1D retroreflection, but it is not diffuse in the vertical direction. To provide this function, a sheet of lenticular material or a lenticular sheet 410 is positioned 418 with its back or planar surface over (and abutting) the prismatic structures 405 of the 1D retroreflection film 404. The lenticules/lenslets 412 face outward (toward a projector) to receive projected light, and the sheet 410 is placed such that the longitudinal axes of the lenticules 412 are horizontal and orthogonal to the axes of prismatic structures 405. In this way, the lenticules 412 of the lenticular sheet 410 are vertically diffusing. The lenticular sheet 410 is formed of a substantially transparent material such as a glass, ceramic, or plastic, and the frequency of the lenticules 412 may be varied widely to practice the invention (e.g., 20 to 100 LPI or the like).

In FIG. 4B, a 1D retroreflective projection screen 420 is provided that achieved horizontal retroreflection with a base film or sheet 424 in the form of a retroreflective film with a light receiving or upper surface with a plurality of microbeads or semi-spherical structures 425. As with screen 400, the projection screen 420 may be provided vertical diffusing functionality by applying 428 a lenticular sheet 410 with its planar or back side 413 abutting or facing the microbeads 425 and its lenticules 412 arranged to be horizontal (e.g., the screen 420 is hung or mounted such that the lenticules 412 are arranged as shown with their axes extending horizontally or parallel to a floor or platform holding a vehicle or movie theatre seat). In some cases, the 1D retroreflective projection screen 420 may be a preferred embodiment as it may provide a brighter display (e.g., may have the highest brightness for a given projector).

Figure 4C:
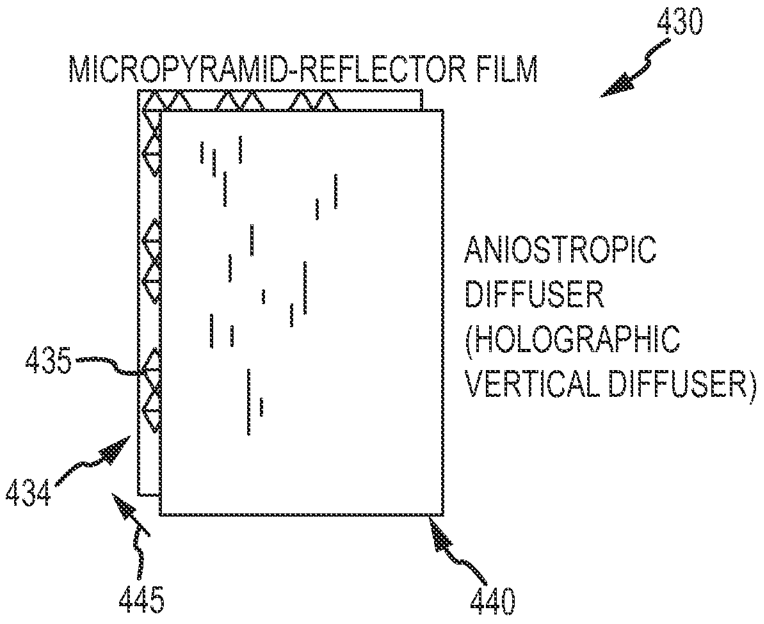

In FIG. 4C, a 1D retroreflective projection screen 430 is provided that includes a reflector film or base layer 434 with a reflecting surface provided with numerous micropyramids 435, and the micropyramid reflector film 434 acts to provide horizontal retroreflection (e.g., a 2D retroreflective screen). In some cases, the film 434 may be considered a high-gain retroreflective screen with micropyramids or corner cube reflectors. By positioning 445 a vertical diffuser 440 over the pyramids 435 of reflector film 434, the screen 430 may be made to be horizontally retroreflective and vertically diffusive. For example, the diffuser 440 may be an anisotropic or light-shaping diffuser such as a holographic vertical diffuser, such as those available from Luminit LLC, Torrance, Calif. USA with substantially only vertical diffusing (or diffusing in one direction which can be chosen to be vertical by proper mounting 445 and hanging of the screen 430). In some cases, such a diffuser 440 may be 40 degrees vertically diffusive and only somewhat horizontally diffusive (such as about 2 degrees) so that light is diffused in a line (which can be provided vertical to the reflector film 434).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the examples of a 3D display system utilized a planar 1D projection screen, but display systems may be provided using arcuate or non-planar projection screens. In one such embodiment as shown with system 500 in FIG. 5, the 1D retroreflective screen 510 may be arranged to have a cylindrical shape or with a semi-circular shape. The row of horizontal microprojectors 532 of a microprojector assembly 530 would be provided about the perimeter of this arcuate, semi-circular, or cylindrical-shaped 1D retroreflective projection screen 510.

Figure 5:
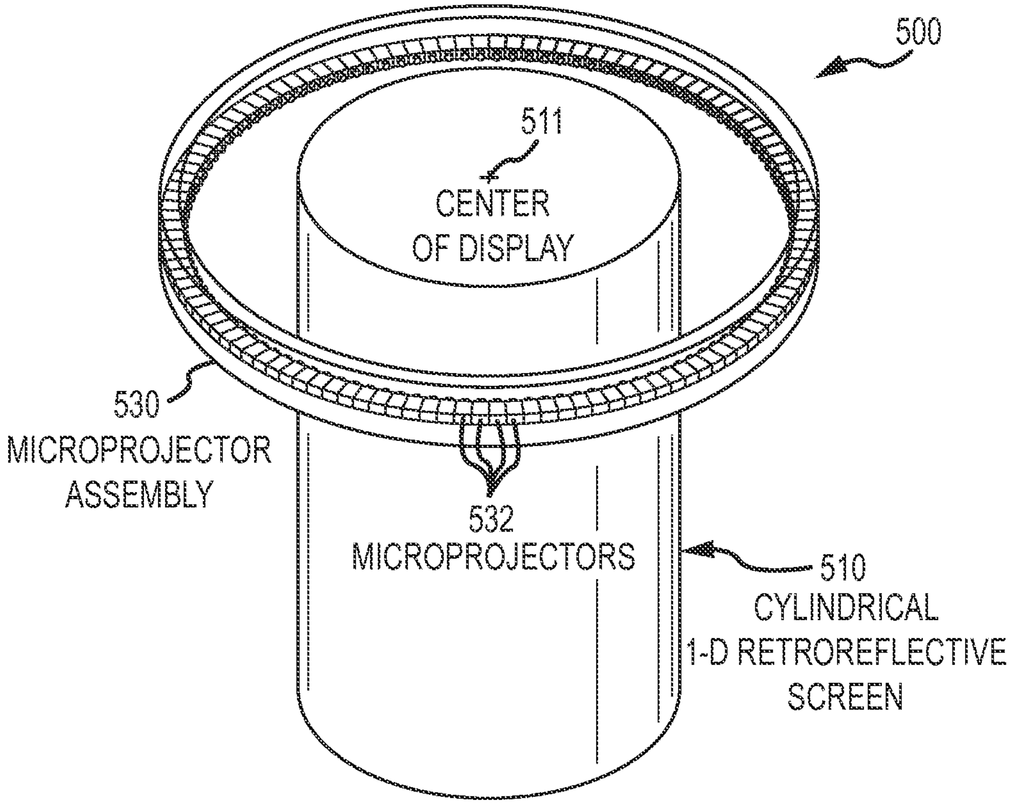
FIG. 5 illustrates similar to FIGS. 1 and 2 a side schematic or functional block view of a 3D display system using a cylindrical 1D retroreflective screen and a plurality of microprojectors extending in an arcuate pattern about the periphery of the screen.

In some cases, the projector assembly 530 may then include numerous projectors 532 as shown in FIG. 5 in system 500 to provide proper perspective views about the entire perimeter or circumference of the projection screen 510. In use, such a 3D display system 500 may be used to "display" a 3D scene that appears to be contained within a cylindrical display case with a center 511 behind the 1D retroreflective projection screen 510 and the viewers may walk about the perimeter of the display (e.g., about the perimeter of the projection screen 510). The diameter of the cylindrical screen 510 may be several inches to several feet up to many feet as long as an adequate number of projectors are provided to provide unique views about the entire projection screen and the cylinder (or arcuate shape) it defines.

With 3D display systems including a 1D retroreflective screen and multiple overhead-mounted microprojectors, each viewer has a projection that is custom for his or her viewpoint and this projection travels with them in ride applications (as the projectors are attached to or mounted within the vehicle seat). This provides a wide field of view and the ability to produce deep scenes without aliasing. Only enough stereo views are needed to allow for slight head movement and prevent pseudoscopic imaging (e.g., may be preferable to provide 5 or more projectors per rider or viewer).

Further, with the 1D retroreflective screen and multiple overhead-mounted projectors used for each viewer, each viewer only sees the retroreflected images from their micro-projectors (e.g., the projectors associated with their viewing location or seat). Multiple 3D display systems (or projector assemblies that share a projection screen) can be used in close proximity without negatively affecting each other. Tracking of head movements is not a requirement as was the case with large beamsplitter-type systems. As a result, the ride vehicle or theatre can be open, and the viewer is unaware of the position of the projectors, thus increasing the sense of immersion in the 3D experience.

Some prior retroreflective screens have been fabricated by others, but these were all fabricated using 2D retroreflective materials either in the form of spheres or corner cubes. In these prior screens, a vertical-only diffuser was added to make the screen 1D retroreflective and diffuse vertically. The vertical only diffuser and 2D retrofilm were always spaced apart.

In contrast, the screens described herein use a brightness enhancement film or microturning film, which, when properly oriented (not obvious that this can or should be done), is a 1D retroreflective material. However, the film does not diffuse vertically, so that the screens described include an added vertical-only diffuser. As a further difference from prior screens, the inventors' screen does not have spacing between the 1D retroreflector and diffuser. In other words, the prior screens require a 2D retroreflective surface while the inventors teach a screen that does not have such a surface.

The described screen has certain advantages. First, it can be made in a roll-to-roll process due to its design. Second, the screen is brighter with more contrast. Third, the screen is typically thinner than prior screen designs. To elaborate, the 2D retroreflective material with spheres can be made roll to roll, but it is not as bright as corner cube material (which cannot be made roll-to-roll, but rather is stamped and tiled, leaving seams). For the spheres only-design, a ring of light incident on the spheres is retroreflected through total internal reflection, but there is a missing cone of light in the middle of the sphere that is not retroreflected. The corner cube design retroreflects a majority of the light. However, the reflection is not through total internal reflection but, rather, is through a metallized reflector. Hence, there is loss. In contrast, the brightness enhancement film shown by the inventors with the above description uses total internal reflection within ridges, so all the light is retroreflected in one direction (and reflected in the orthogonal direction) and it is extremely bright.

Because only ridges are made, a roll-to-roll process can be used for easier and cleaner large-scale construction. Also, the brightness enhancement film will reflect (not retroreflect) the light vertically, so projectors above a viewer's head will preferentially reflect into the viewer's eyes. The vertical diffusion then adds additional vertical view zone about that reflection. In comparison, the prior 2D retroreflector (even with the vertical diffuser) preferentially reflects back to the projector (undesirably above the viewer's head), then the vertical diffusion adds a vertical zone about the projector. As can be seen, the use of brightness enhancement film taught by the inventors makes the image brighter in a zone centered at the viewer's eyes, not about the projector.

We claim:

1. An autostereoscopy apparatus, comprising:

a projection screen with a light receiving surface that is horizontally retroreflective and vertically diffusive;

a projector assembly comprising at least two projectors arranged side-by-side such that projection lenses of the projectors are horizontally aligned in a row; and a controller selectively operating the projectors to project at least two differing point-of-view images toward the light receiving surface of the projection screen, wherein the projection screen comprises a bottom layer including a retroreflective film that is retroreflective in the horizontal direction and a top layer covering the bottom layer, the top layer including a sheet of lenticular material arranged for vertical diffusing, wherein longitudinal axes of lenticules of the lenticular material extend parallel to the horizontal, whereby the lenticules provide the vertical diffusing of the projection screen, wherein the retroreflective film comprises a brightness enhancement film arranged to provide retroreflection, using total internal reflection, in a single direction that is orthogonal to a direction of diffusing provided by the lenticules of the lenticular material of the top layer, wherein the projection screen is configured with the light receiving surface providing a cylindrical display, wherein the projectors of the projector assembly are arranged in an arcuate pattern about the exterior of the cylindrical display to project the differing point of views toward the light receiving surface, whereby the light receiving surface faces outward from the center of the cylindrical display, wherein adjacent pairs of the horizontally aligned projectors are spaced apart a distance in the range of 2 to 3 inches, and wherein each of the adjacent pairs of the horizontally aligned projectors are operated by the controller to project, in the differing point-of-view images, a left eye image and a right eye image, respectively, to a viewer viewing the light receiving surface.

2. The apparatus of claim 1, wherein the projection assembly comprises at least five of the projectors and wherein adjacent pairs of the projectors are positioned with the projection lenses separated by less than about 3 inches.

3. The apparatus of claim 1, wherein the row of the horizontally aligned projectors is positioned about the perimeter of the cylindrical display and wherein centers of the lenses are arranged in a horizontal plane to provide horizontal alignment.

4. The apparatus of claim 3, wherein the projector assembly includes a number of the horizontally aligned projectors adequate to provide unique views to viewers positioned along the entire length of the perimeter.

5. An amusement park ride, comprising:

a passenger vehicle with a seat for receiving a passenger;

a row of three, four, or five microprojectors positioned in the passenger vehicle, wherein the microprojectors are arranged side-by-side with horizontally aligned projection lenses at a predefined height above a pan of the seat, whereby the microprojectors are positioned above a head of the passenger such that the projection lenses are behind or toward the seat relative to eyes of the passenger; and a one-dimensional (1D) retroreflective screen positioned along a ride path of the passenger vehicle for receiving projected light from the microprojectors and reflecting the received light back toward the passenger vehicle, wherein the 1D retroreflective screen is horizontally retroreflective and vertically diffusive of the received light from the microprojectors, wherein the 1D retroreflective screen comprises a retroreflective film that is retroreflective at least in the horizontal direction and a transparent sheet of lenticular material positioned over the retroreflective film arranged for vertical diffusing, wherein the retroreflective film comprises a brightness enhancement film arranged to provide retroreflection in a direction orthogonal to a direction of diffusing provided by lenticules of the transparent sheet of the lenticular material, wherein the predefined height is at least about two feet, and wherein the ride further includes a controller providing a differing, spatially-offset view of an image to each of the microprojectors to display a still or animated 3D image viewable by the passenger positioned in the seat and receiving a first one of the differing, spatially-offset views with a left eye from a first one of the microprojectors and a second one of the differing, spatially-offset views with a right eye from a second one of the microprojectors adjacent the first one of the microprojectors.

6. The ride of claim 5, wherein the controller selectively operates only a pair of the microprojectors at a time based on input from a head position sensor or eye detection mechanism, whereby two of the microprojectors above a viewer's eyes are operated selectively as a viewer moves their head.

* * * * *